United States Patent
Yang et al.

(10) Patent No.: US 10,951,375 B2
(45) Date of Patent: Mar. 16, 2021

(54) METHOD AND DEVICE FOR TRANSCEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Eunsun Kim, Seoul (KR); Kijun Kim, Seoul (KR); Byounghoon Kim, Seoul (KR); Hanbyul Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/335,393

(22) PCT Filed: Sep. 29, 2017

(86) PCT No.: PCT/KR2017/010965
§ 371 (c)(1),
(2) Date: Mar. 21, 2019

(87) PCT Pub. No.: WO2018/062944
PCT Pub. Date: Apr. 5, 2018

(65) Prior Publication Data
US 2019/0288817 A1    Sep. 19, 2019

Related U.S. Application Data

(60) Provisional application No. 62/401,882, filed on Sep. 29, 2016.

(51) Int. Cl.
*H04L 5/00* (2006.01)
*H04W 72/04* (2009.01)
(Continued)

(52) U.S. Cl.
CPC ........ *H04L 5/0051* (2013.01); *H04J 13/0062* (2013.01); *H04L 5/00* (2013.01);
(Continued)

(58) Field of Classification Search
CPC ....... H04L 5/0051; H04L 5/0044; H04L 5/00; H04J 13/0062
See application file for complete search history.

(56) References Cited

U.S. PATENT DOCUMENTS

2012/0044877 A1* 2/2012 Ratasuk .............. H04W 52/146
370/329
2015/0189640 A1* 7/2015 Lee .......................... H04B 7/26
370/329
(Continued)

FOREIGN PATENT DOCUMENTS

WO    2016053639 A1    4/2016

OTHER PUBLICATIONS

Huawei, et al.: "Discussion on grant-free transmission", R1-166095, 3GPP TSG RAN WG1 Meeting #86, Gothenburg, Sweden, Aug. 22-26, 2016.
(Continued)

*Primary Examiner* — Kevin C. Harper
*Assistant Examiner* — Henry Baron
(74) *Attorney, Agent, or Firm* — Dentons US LLP

(57) ABSTRACT

The present invention relates to a wireless communication system and particularly to a method and a device for the method, the method comprising: a step of receiving data on a competition-based resource pool; a step of selecting, based on the size of the data, N number of competition-based resources from a plurality of competition-based resources constituting the competition-based resource pool; and a step of transmitting the data to a base station by using the N number of competition-based resources, wherein N is indicated via a reference signal transmitted along with the data.

12 Claims, 13 Drawing Sheets

(51) Int. Cl.
*H04J 13/00* (2011.01)
*H04W 74/08* (2009.01)

(52) U.S. Cl.
CPC ... *H04W 72/0466* (2013.01); *H04W 72/0493* (2013.01); *H04W 74/08* (2013.01)

(56) References Cited

U.S. PATENT DOCUMENTS

| | | |
|---|---|---|
| 2016/0100430 A1 | 4/2016 | Dabeer et al. |
| 2016/0127092 A1 | 5/2016 | Zhang |
| 2016/0270083 A1 | 9/2016 | Zeng et al. |
| 2018/0007529 A1* | 1/2018 | Shin .................. H04J 11/00 |
| 2018/0270803 A1* | 9/2018 | Kwak ................ H04W 74/08 |
| 2019/0215822 A1* | 7/2019 | Zhang ................ H04L 5/0094 |

OTHER PUBLICATIONS

LG Electronics, et al.: "WF on further clarification on grant-free transmission for mMTC", R1-168538, 3GPP TSG RAN WG1 Meeting #86, Gothenburg, Sweden, Aug. 22-26, 2016.

Intel Corporation, "Grant-less and non-orthogonal UL transmissions in NR", 3GPP TSG-RAN WG1 #86, Aug. 22-26, 2016, R1-167698, XP051126036A.

\* cited by examiner

PUCCH format 1a and 1b structure (normal CP case)

METHOD AND DEVICE FOR TRANSCEIVING WIRELESS SIGNAL IN WIRELESS COMMUNICATION SYSTEM

This application is a National Stage Entry of International Application No. PCT/KR2017/010965 filed Sep. 29, 2017, which claims priority to U.S. Provisional Application No. 62/401,882 filed Sep. 29, 2016, all of which are incorporated herein by reference.

TECHNICAL FIELD

The present disclosure relates to a wireless communication system, and more particularly, to a method and device for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method and apparatus for efficiently transmitting/receiving a wireless signal in a wireless communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a of transmitting data at a user equipment (UE) in a wireless communication system includes receiving information about a contention-based resource pool, selecting N contention-based resources from among a plurality of contention-based resources included in the contention-based resource pool, based on a size of the data, and transmitting the data to a base station (BS) in the N contention-based resources. N is indicated by a reference signal transmitted along with the data.

In another aspect of the present disclosure, a UE for use in a wireless communication system includes a radio frequency (RF) module, and a processor. The processor is configured to receive information about a contention-based resource pool, to select N contention-based resources from among a plurality of contention-based resources included in the contention-based resource pool, based on a size of data, and to transmit the data to a base station (BS) in the N contention-based resources. N is indicated by a reference signal transmitted along with the data.

Preferably, N may be indicated by a seed value used for scrambling the reference signal.

Preferably, the reference signal may be generated based on a Zadoff-Chu (ZC) sequence or a constant amplitude zero auto-correlation (CAZAC) sequence, and N may be indicated by a root index used for generating the reference signal.

Preferably, N may be indicated by a length of a sequence used to configure the reference signal.

Preferably, N may be limited to $2^n$ where n may be an integer equal to or larger than 0.

Preferably, each of the N contention-based resources may carry data including the same UE identification information.

Preferably, the wireless communication system may include a $3^{rd}$ generation project partnership long term evolution (3GPP LTE)-based wireless communication system.

Advantageous Effects

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE FOR CARRYING OUT THE INVENTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
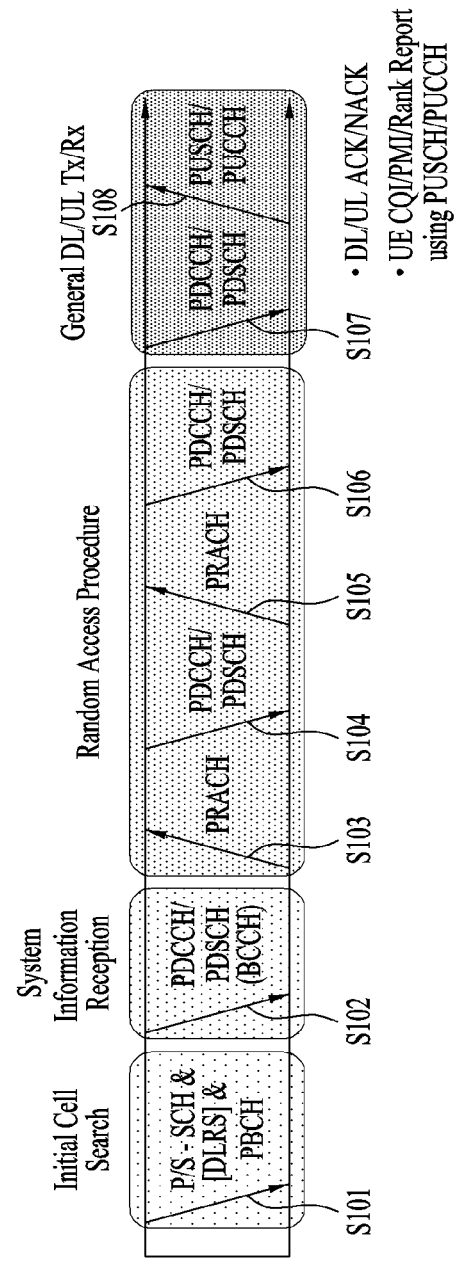
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
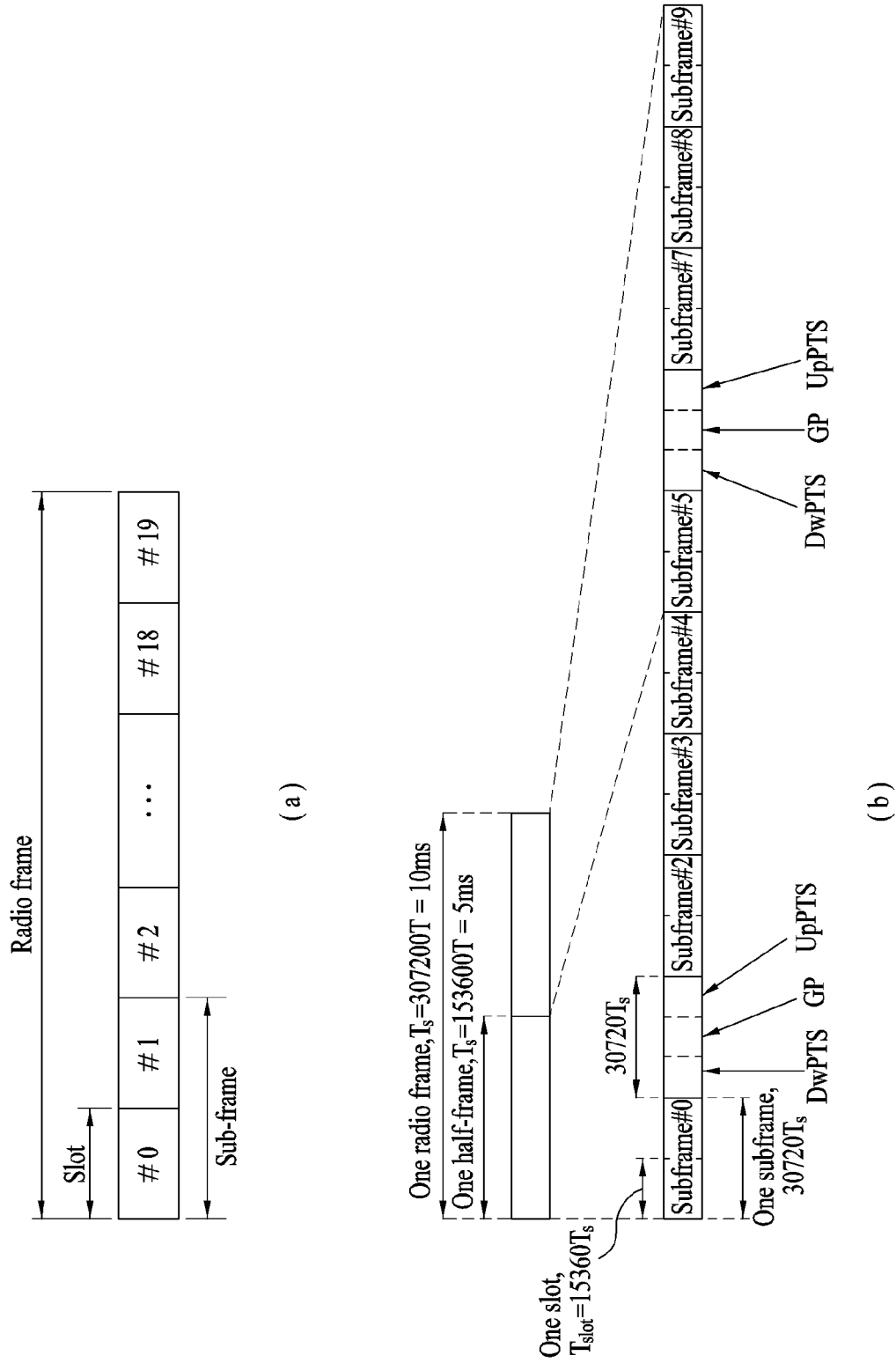
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
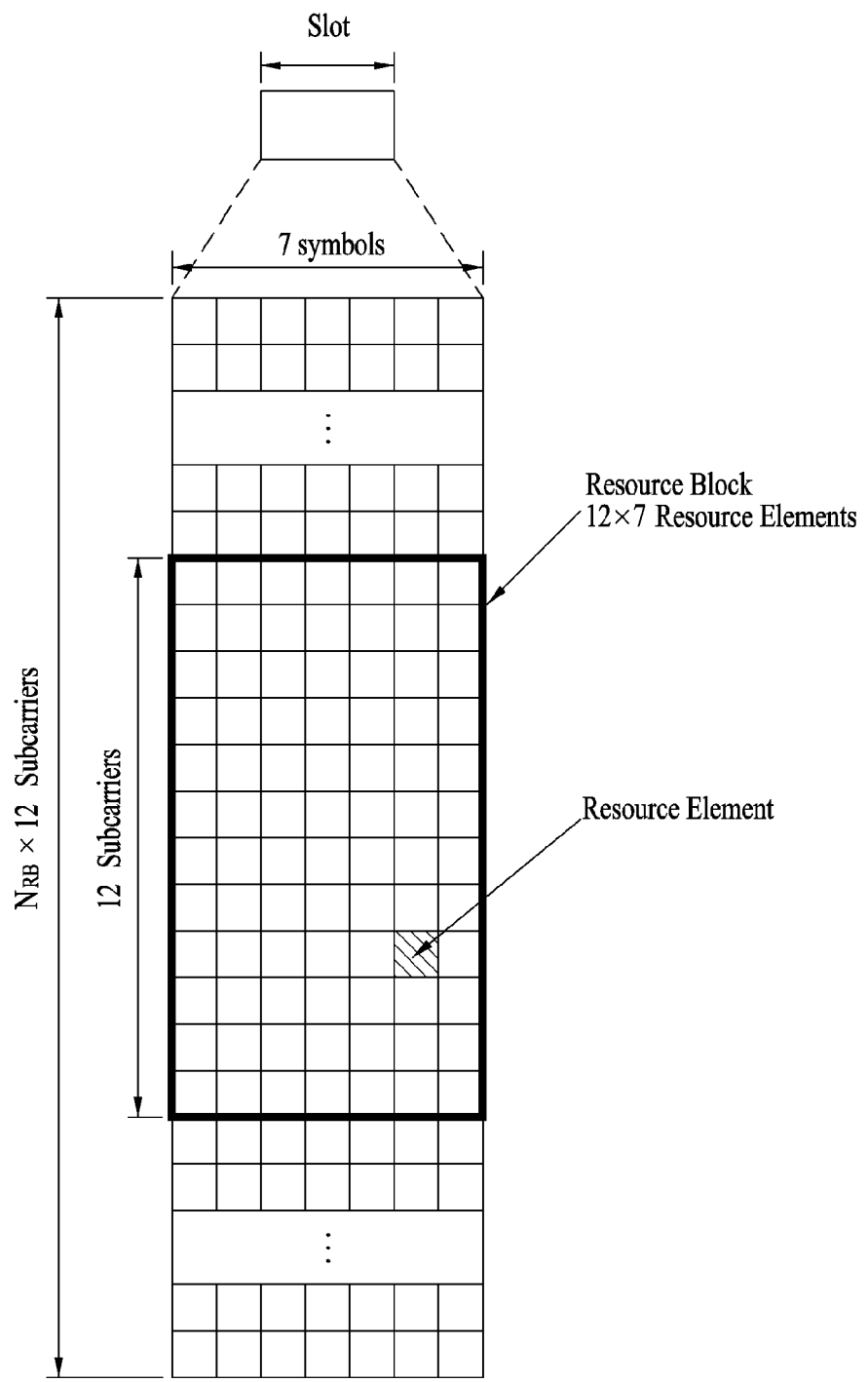
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
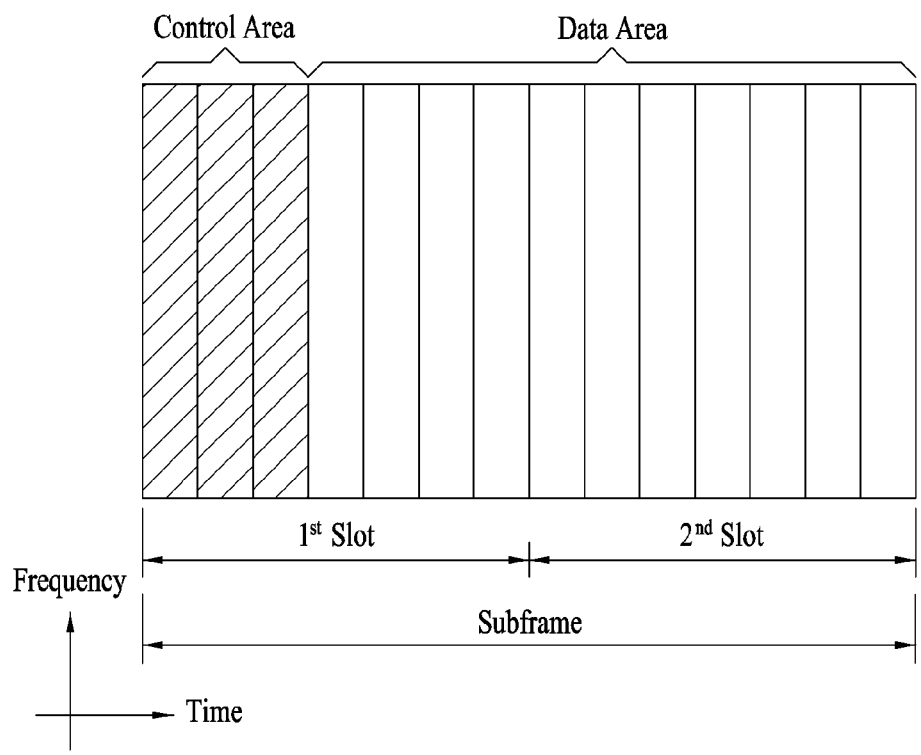
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
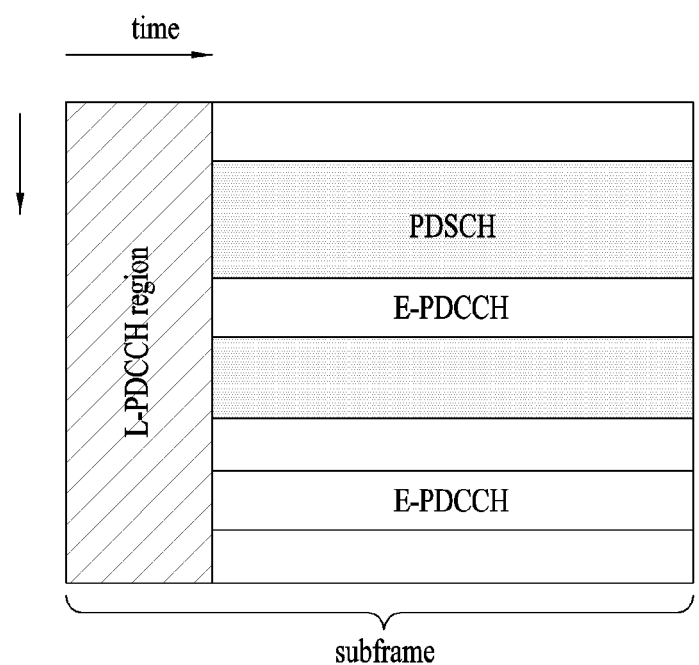
FIG. 5 illustrates an example of an enhanced physical downlink control channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission
DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
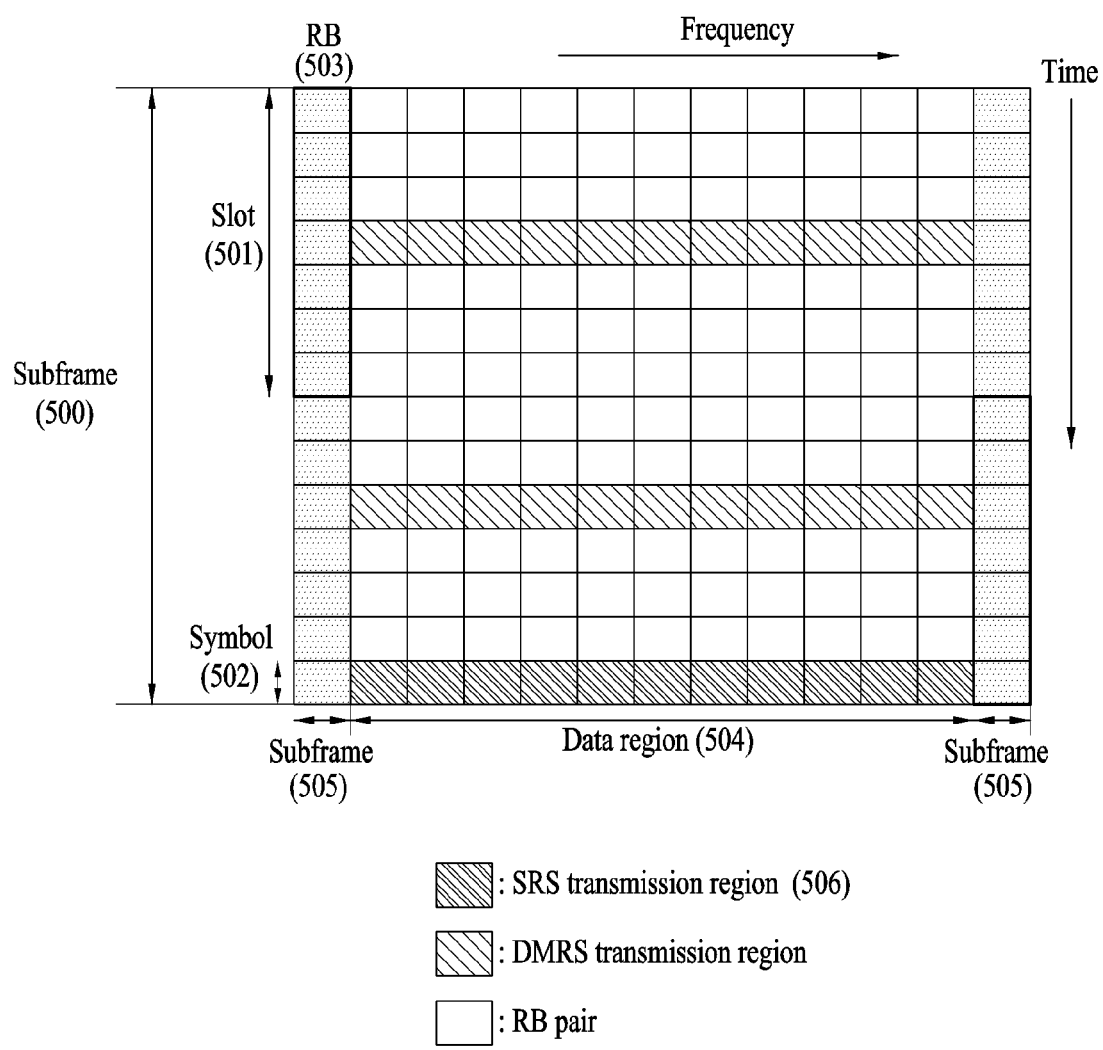
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

The SRS includes constant amplitude zero auto correlation (CAZAC) sequences. SRSs transmitted from several UEs are CAZAC sequences $r^{SRS}(n)=r_{u,v}^{(\alpha)}(n)$ having different cyclic shift values $\alpha$ according to Equation 1.

$$\alpha = 2\pi \frac{n_{SRS}^{cs}}{8},$$ [Equation 1]

where $n_{SRS}^{cs}$ is a value set to each UE by a higher layer and has an integer value between 0 and 7.

CAZAC sequences generated from one CAZAC sequence through cyclic shift have zero-correlation values with sequences having different cyclic shift values. Using such property, SRSs of the same frequency domain may be divided in accordance with CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

In order to satisfy a transmission power $P_{SRS}$ of a UE, an SRS sequence $r^{SRS}(n)$ is first multiplied by an amplitude scaling factor $\beta_{SRS}$ and then mapped into a resource element (RE) having an index (k, l) from $r^{SRS}(0)$ by the following Equation 2.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases},$$ [Equation 2]

where $k_0$ denotes a frequency domain start point of the SRS, and $M_{sc,b}^{RS}$ is a length (that is, bandwidth) of a sounding reference signal sequence expressed by a subcarrier unit defined in the following Equation 3.

$$M_{sc,b}^{RS}=m_{SRS,b}N_{sc}^{RB}/2$$ [Equation 3]

In the Equation 3, $m_{SRS,b}$ denotes an uplink bandwidth $N_{RB}^{UL}$ signaled from the eNB.

Figure 7:
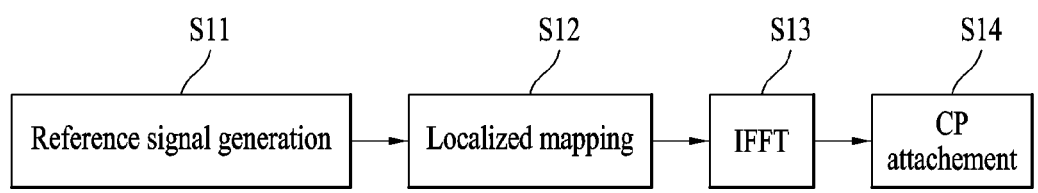
FIG. 7 illustrates a signal processing procedure for transmitting a reference signal (RS) to an uplink.

FIG. 7 illustrates a signal processing procedure for transmitting a reference signal (RS) to an uplink. Data is converted into a frequency-domain signal through a DFT precoder and then transmitted through IFFT after frequency mapping. On the other hand, an RS is transmitted without passing through the DFT precoder. Specifically, after an RS sequence is directly generated (S11) in the frequency domain, the RS is transmitted through sequential processes of localized mapping (S12), IFFT (S13), and cyclic prefix (CP) attachment (S14).

RS sequence $r_{u,v}^{(\alpha)}(n)$ is defined by a cyclic shift $\alpha$ of a base sequence, and may be expressed as the following Equation 4.

$$r_{u,v}^{(\alpha)}(n)=e^{j\alpha n}\bar{r}_{u,v}(n), 0 \leq n \leq M_{sc}^{RS},$$ [Equation 4]

where $M_{sc}^{RS}=mN_{sc}^{RB}$ is a length of the RS sequence, $N_{sc}^{RB}$ is a resource block size expressed in a unit of subcarrier, and m is $1 \leq m \leq N_{RB}^{max,UL}$. $N_{RB}^{max,UL}$ denotes a maximum uplink transmission band.

Base sequences $\bar{r}_{u,v}(n)$ are divided into groups. $u \in \{0, 1, \ldots, 29\}$ denotes a group number, and v corresponds to a base sequence number within the corresponding group. Each group includes one base sequence (v=0) of length $M_{sc}^{RS}=mN_{sc}^{RB}$ ($1 \leq m \leq 5$) and two base sequences (v=0,1) of each length $M_{sc}^{RS}=mN_{sc}^{RB}$ ($6 \leq m \leq N_{RB}^{max,UL}$). Each of the sequence group number u and the corresponding number v within the corresponding group may vary depending on time. The definition of the base sequence $\bar{r}_{u,v}(0), \ldots, \bar{r}_{u,v}(M_{sc}^{RS}-1)$ depends on the sequence length $M_{sc}^{RS}$.

Base sequences of length $3N_{sc}^{RB}$ or more may be defined as follows.

For $M_{sc}^{RS} \geq 3N_{sc}^{RB}$, the base sequence $\bar{r}_{u,v}(0), \ldots, \bar{r}_{u,v}(M_{sc}^{RS}-1)$ is given by the following Equation 5.

$$r_{u,v}(n)=x_q(n \bmod N_{ZC}^{RS}), 0 \leq n < M_{sc}^{RS},$$ [Equation 5]

where a qth root Zadoff-Chu sequence may be defined by the following Equation 6.

$$x_q(m) = e^{-j\frac{\pi q m(m+1)}{N_{ZC}^{RS}}}, 0 \leq m \leq N_{ZC}^{RS} - 1,$$ [Equation 6]

where q satisfies the following Equation 7.

$$q=\lfloor\bar{q}+1/2\rfloor+v\cdot(-1)^{\lfloor\bar{q}\rfloor}$$

$$\bar{q}=N_{ZC}^{RS}\cdot(u+1)/31,$$ [Equation 7]

where the length $N_{ZC}^{RB}$ of the Zadoff-Chu sequence is given by the greatest prime number to satisfy $N_{ZC}^{RS}<M_{sc}^{RS}$.

Base sequences of length less than $3N_{sc}^{RB}$ may be defined as follows. First of all, for $M_{sc}^{RS}=N_{sc}^{RB}$ and $M_{sc}^{RS}=2N_{sc}^{RB}$, the base sequences are given by the following Equation 8.

$$r_{u,v}(n)=e^{j\varphi(n)\pi/4}, 0 \leq n \leq M_{sc}^{RS}-1,$$ [Equation 8]

where a value of $\varphi(n)$ for $M_{sc}^{RS}=N_{sc}^{RB}$ is also given by a similar Table 4. A value of $\varphi(n)$ for $M_{sc}^{RS}=2N_{sc}^{RB}$ 1 is also given by a similar Table.

TABLE 4

| u | $\varphi(0), \ldots, \varphi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −3 | −3 | 3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |

TABLE 4-continued

| u | $\varphi(0), \ldots, \varphi(11)$ | | | | | | | | | | | |
|---|---|---|---|---|---|---|---|---|---|---|---|---|
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A reference signal for PUSCH is determined as follows.

A reference signal sequence for $r^{PUSCH}(\cdot)$ for PUSCH is defined by $r^{PUSCH}(m \cdot M_{sc}^{RS}+n)=r_{u,v}^{(\alpha)}(n)$, wherein m and n satisfy $$m = 0, 1$$

$$n = 0, \ldots, M_{sc}^{RS} - 1$$

$r^{PUSCH}(\cdot)$ and $M_{sc}^{RS}=M_{sc}^{PUSCH}$.

Cyclic shift in one slot is given by $\alpha=2 n_{cs}/12$ together with $n_{cs}=(n_{DMRS}^{(1)}+n_{DMRS}^{(2)}+n_{PRS}(n_s))$ mod 12.

$n_{DMRS}^{(1)}$ is a broadcasted value, $n_{DMRS}^{(2)}$ is given by uplink scheduling allocation, and $n_{PRS}(n_s)$ is a cell-specific cyclic shift value. $n_{PRS}(n_s)$ varies depending on a slot number $n_s$, and is given by $n_{PRS}(n_s)=\Sigma_{i=0}^{7}c(8\cdot n_s+i)\cdot 2^i$.

c(i) is a pseudo-random sequence, and c(f) is a cell-specific value. A pseudo-random sequence generator may be reset to $$c_{init} = \left\lfloor \frac{N_{ID}^{cell}}{30} \right\rfloor \cdot 2^5 + f_{ss}^{PUSCH}$$

at the start of a radio frame.

Table 5 illustrates a cyclic shift field in a Downlink Control Information (DCI) format and $n_{DMRS}^{(2)}$.

TABLE 5

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in PUSCH is as follows.

The sequence is multiplied by an amplitude scaling factor $\beta_{PUSCH}$ and mapped into the same set of physical resource blocks (PRBs) used for a corresponding PUSCH within a sequence starting with $r^{PUSCH}(0)$. The mapping into resource elements (k,l), with l=3 for normal cyclic prefix and l=2 for extended cyclic prefix, within the subframe is performed in such a manner that the order of k is increased and then a slot number is increased.

In summary, if length is $3N_{sc}^{RB}$ or more, a ZC sequence is used with cyclic extension and, if length is less than $3N_{sc}^{RB}$, a computer generated sequence is used. A cyclic shift is determined in accordance with a cell-specific cyclic shift, a UE-specific cyclic shift and a hopping pattern.

Figure 8:
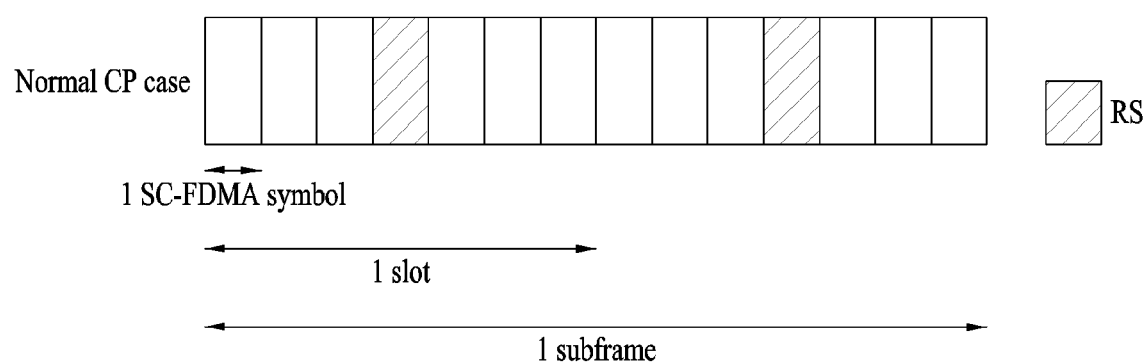
FIG. 8 illustrates a structure of a demodulation reference signal (DMRS) for a PUSCH.

FIG. 8 illustrates a structure of a demodulation reference signal (DMRS) for a PUSCH. Referring to FIG. 8, the DMRS is transmitted through fourth and eleventh SC-FDMA symbols.

Figure 9:
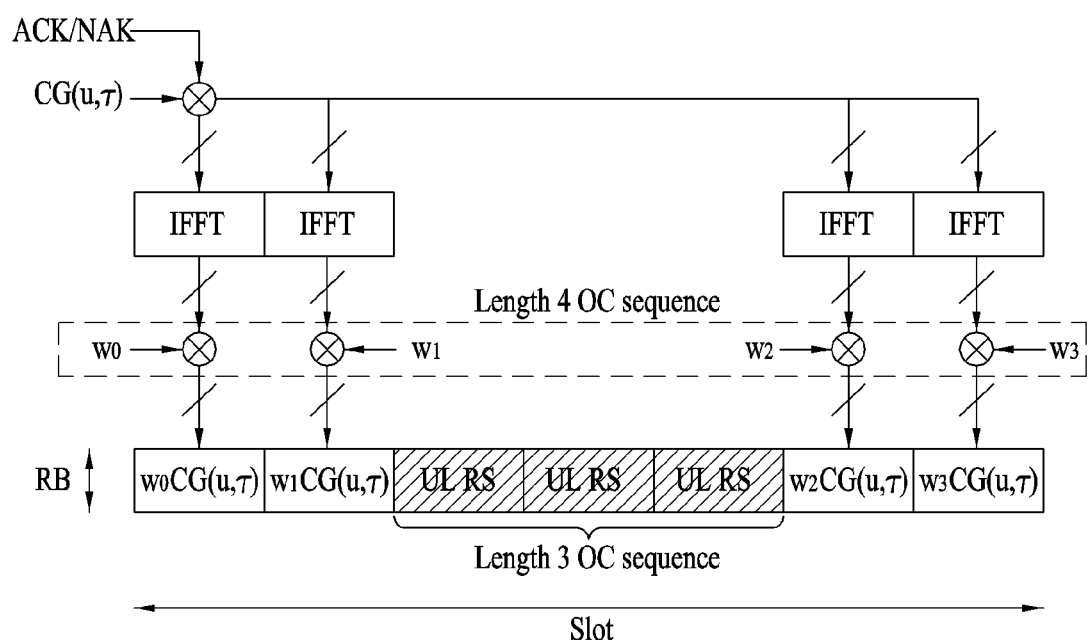
FIG. 9 illustrates a slot level structure of PUCCH formats 1a and 1b.

FIG. 9 illustrates PUCCH formats 1a and 1b in case of normal CP. The same control information is repeated on a slot basis in a subframe in PUCCH Format 1a and 1b. A UE transmits ACK/NACK signals through different resources that include different Cyclic Shifts (CSs) (frequency-domain code) of a Computer Generated-Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. OC sequences w0, w1, w2 and w3 are applicable to a random time domain (after FFT modulation) or to a random frequency domain (before FFT modulation). RS signal of each UE is also transmitted through different resources that include different cyclic shifts of a CG-CAZAC sequence and orthogonal cover codes w0, w1 and w2.

Length-4 and length-3 OCs for PUCCH Format 1/1a/1b are illustrated in Table 6 and Table 7 below.

TABLE 6

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 7

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Figure 10:
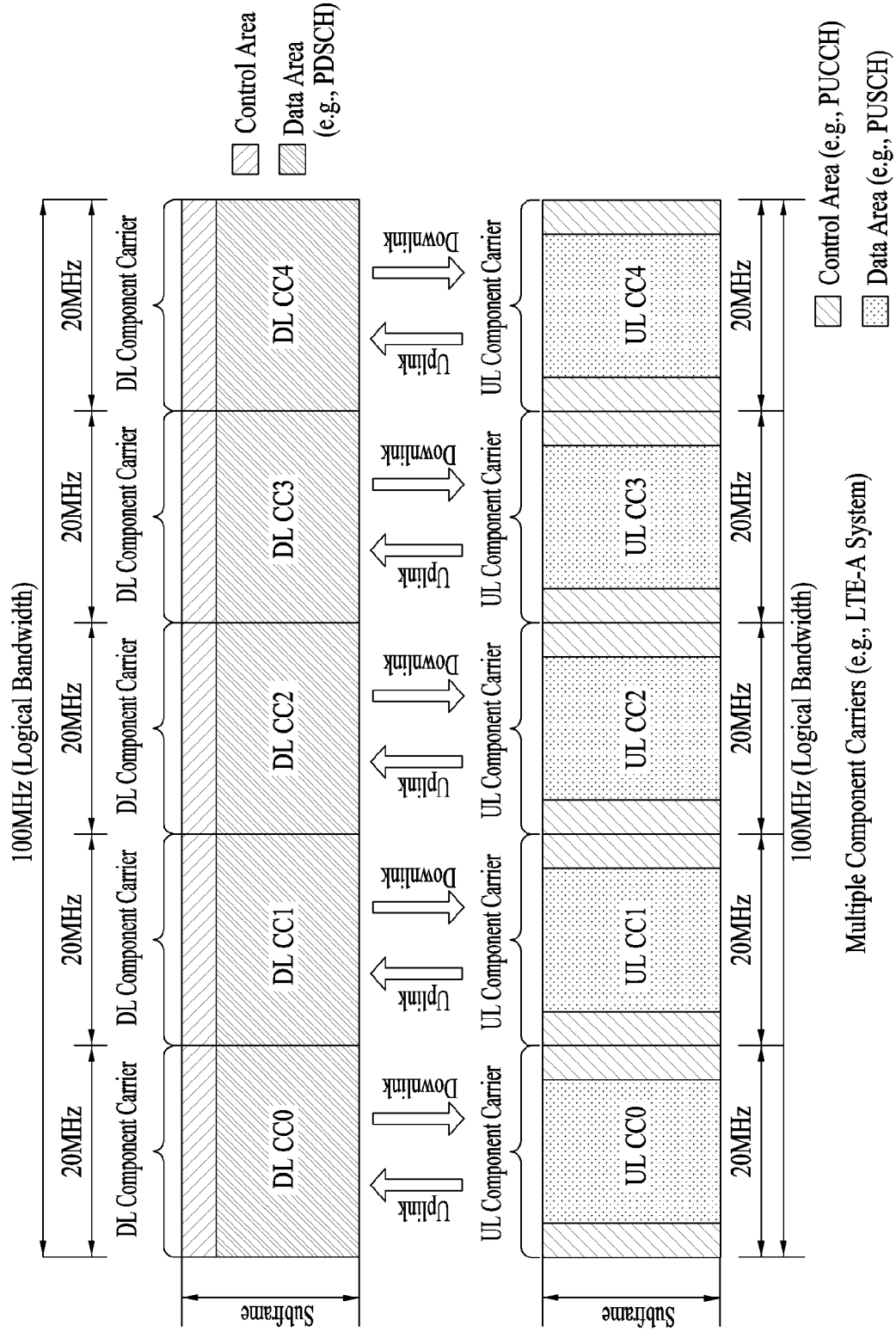
FIG. 10 illustrates a carrier aggregation (CA)-based wireless communication system.

FIG. 10 illustrates carrier aggregation (CA) communication system.

Referring to FIG. 10, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 11:
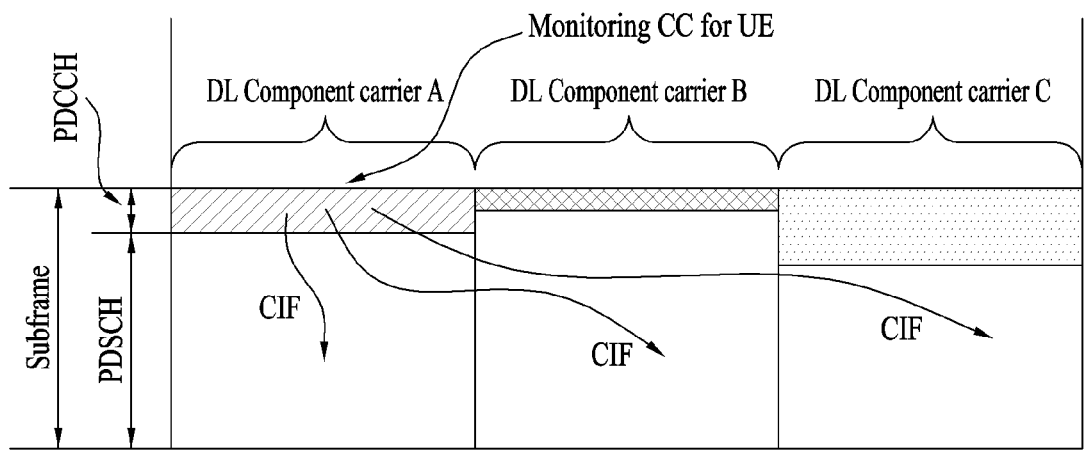
FIG. 11 illustrates cross-carrier scheduling.

FIG. 11 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 12:
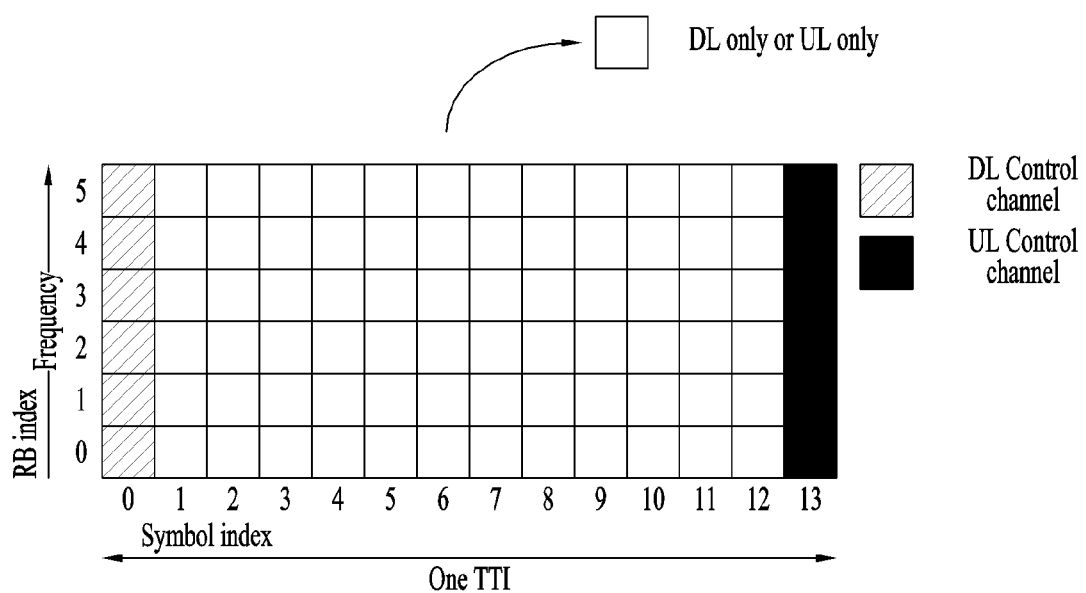
FIG. 12 illustrates a structure of a self-contained subframe.

In next-generation RAT (Radio Access Technology), a self-contained subframe is considered in order to minimize data transmission latency. FIG. 12 illustrates a self-contained subframe structure. In FIG. 12, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized As examples of self-contained subframe types which can be configured/set, the following four subframe types can be considered. Respective periods are arranged in a time sequence.

DL control period+DL data period+GP (Guard Period)+ UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiments

The present disclosure proposes a multiple access (MA) scheme in which a plurality of UEs select available resources (e.g., autonomously) without (UL) scheduling of an eNB (e.g., in a grant-free manner) and transmit data based on contention in the selected resources in a new radio access technology (RAT) system. The present disclosure is applicable to a massive machine type communication (MTC) situation with a plurality of UEs. Specifically, the present disclosure defines a minimum resource unit (for convenience, referred to as a contention resource unit (CRU)) used for contention-based transmissions of a plurality of UEs, and proposes a CRU-using contention-based MA method and a related UE operation. The present disclosure may be limited to an operation in the state where a UE is connected to a network (e.g., an eNB) (e.g., in RRC connected state). That is, the present disclosure may be limited to an operation in a state other than the state where the UE is not connected to the network (e.g., the eNB) (e.g., in RRC idle state).

[1] CRU(Contention Resource Unit)

Figure 13:
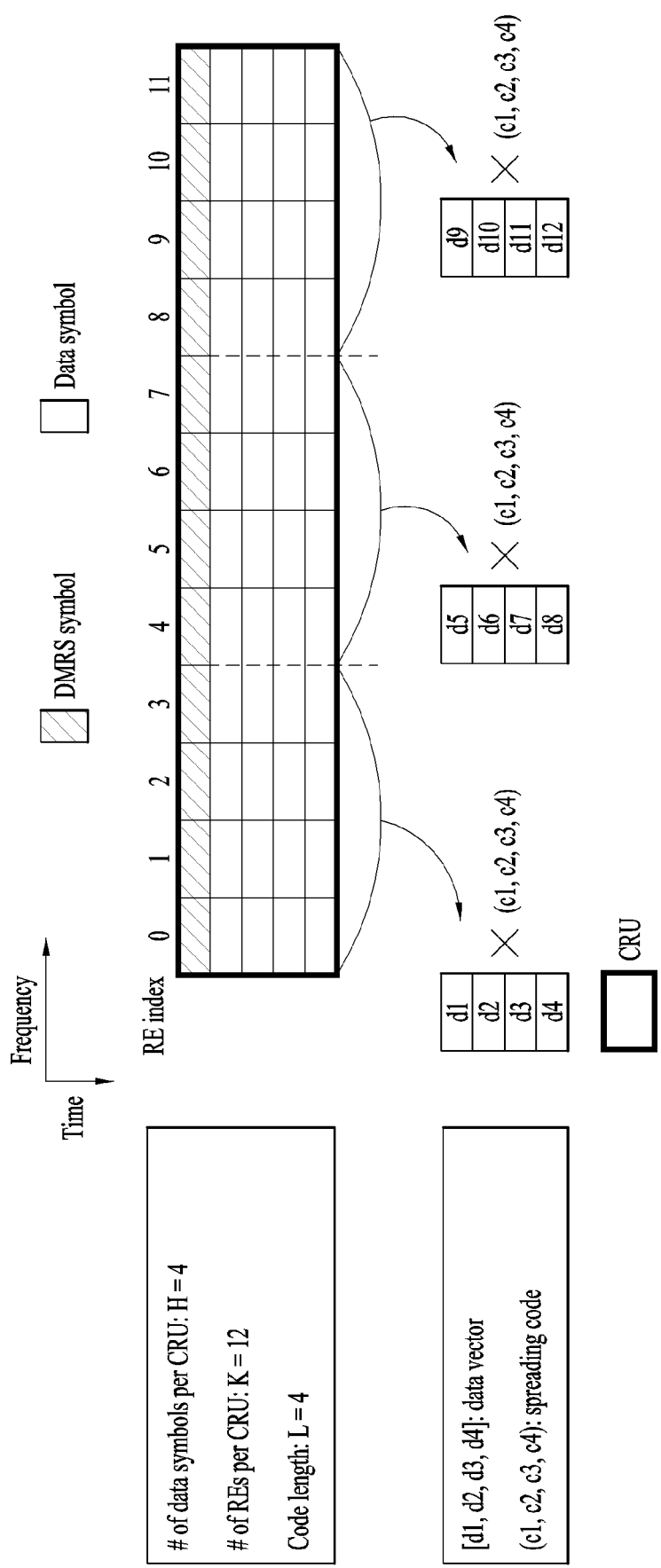
FIGS. 13 to 14 illustrate signal transmission procedure according to the present disclosure.

FIG. 13 illustrates an exemplary CRU configuration. A minimum resource unit in which a plurality of UEs perform contention-based transmission may be defined as a CRU.

Referring to FIG. 13, a CRU may be defined as a time/frequency (T/F) resource including one DMRS transmission symbol and H data transmission symbols in the time domain by K REs (or subcarriers) in the frequency domain. H and K are positive integers, and H=4 and K=12 in FIG. 13. A (transmission) symbol is an OFDM(A) symbol or SC-FDM(A) symbol. The (frequency-domain) length (i.e., spreading factor) of a spreading code used for data transmission is L, and the number (e.g., loading factor) of spreading codes available for data transmission is M. Each of L and M may be an integer equal to or larger than 2. In FIG. 13, L=4 and, for example, M=6. L and M may be in the relationship that L<M, and K may be set to a common multiple of L and M. For example, spreading codes may be given as follows.

TABLE 8

| Sequence index | Spreading code (or Orthogonal sequence) | |
|---|---|---|
| (0, ..., M−1) | L = 4 | L = 2 |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

On the assumption that up to M UEs may simultaneously participate in contention (using different spreading codes)

for a DMRS, it may be necessary to allocate M orthogonal DMRS resources, for (multi-UE) detection performance of an eNB. For this purpose, if a Zadoff-Chu (ZC) sequence or a constant amplitude zero autocorrelation (CAZAC) sequence (for convenience, generically called a ZC sequence) is used for the DMRS, cyclic shifts (CSs) may be used for DMRS resource allocation. Further, if a pseudo random (PR) or Gold sequence (for convenience, generically referred to as a PR sequence) is used for the DMRS, orthogonal cover codes (OCCs) may be used for DMRS resource allocation. Additionally, DMRS resources may be allocated in frequency division multiplexing (FDM) (e.g., in the form of transmission combs (TCs)) by configuring different DMRS resources with different resource element groups (REGs), each DMRS resource including a group of equi-distant (non-contiguous) REs. For details, refer to [3].

M spreading codes used for data transmission and M DMRS resources may be paired in a one-to-one correspondence. For example, if the spreading codes for data transmission are indexed as 0, 1, . . . , M−1, and the DMRS resources are indexed as 0, 1, . . . , M−1, a spreading code for data transmission and a DMRS resource which have the same indexes may be paired. Then, the UE may select one of total M (spreading code, DMRS resource) pairs, and perform data transmission in the selected (spreading code, DMRS resource) pair.

Since a CRU includes a total of (H*K) (e.g., 48) data REs, and the same data (e.g., d, where i=1, . . . , 12) is spread with a length-L code (e.g., L=4) (e.g., [c1 c2 c3 c4]), the number of actual effective coded data REs may be $\{(H*K)/L\}$. Let the number of coded bits transmitted per data RE according to a modulation order be denoted by Q, and let a data code rate (=the number of original bits/the number of coded bits) based on channel coding be denoted by R. Then, the size (e.g., transport block size (TBS)) of data transmittable in one CRU may be determined to be $Y (=\{(H*K*Q*R)/L\})$ bits. Accordingly, a CRU-based transmittable minimum data size may be determined to be $Y (=\{(H*K*Q*R)/L\})$ bits.

Parameters (e.g., H, K, L, Q, R) required for configuring a CRU may be configured by signaling from an eNB. The parameters (e.g., H, K, L, Q, R) required for configuring a CRU may be configured according to later-described [4], which should not be construed as limiting the present disclosure.

[2] CRU Selection According to TBS

With a CRU and its minimum TBS (i.e., Y bits) determined based on [1], if data having a larger TBS which is a multiple of Y (e.g., B*Y bits where B is a positive integer) needs to be transmitted, the UE may transmit the data having the TBS by simultaneously selecting/using a plurality of (e.g., B) CRUs. Specifically, the UE may 1) divide the whole data into segments each including Y bits, and map/transmit coded bits obtained by separately encoding each Y-bit segment to/in B different CRUs, or 2) separately map/transmit coded bits obtained by jointly encoding the total (B*Y) data bits to/in B CRUs.

If the UE selects a plurality of CRUs, the UE may need a method of selecting a (spreading code, DMRS resource) pair for use in data transmission in each of the CRUs. For example, the UE may select/use the same (spreading code, DMRS resource) pair for all of the simultaneously selected plurality of CRUs. In another example, a pattern of (spreading code, DMRS resource) pairs to be selected/used for the respective CRUs may be pre-defined/pre-configured according to the number and indexes of the CRUs that the UE has simultaneously selected. The plurality of CRUs may be selected from a CRU pool. The CRU pool may be configured cell-specifically, UE group-specifically, or UE-specifically. The CRU pool may be configured automatically using UE identification information according to a pre-defined method or by signaling from the eNB. The parameters (e.g., H, K, L, Q, R) required for configuring one CRU and/or the total number of CRUs included in the CRU pool may be configured based on later-described [4], which should not be construed as limiting the present disclosure.

In consideration of the degradation of multi-UE detection performance caused by blocking between UEs that transmit the same TBS and partial overlap between resources used in a large-TBS transmission, the number (e.g., B) of CRUs that one UE may simultaneously select/use for data transmission may be limited to $2^n$ (n is 0 or a positive integer). Accordingly, TBS transmittable in a contention-based manner may be specified as (2n*Y) bits. Further, the total number of CRUs available for contention-based transmission may be set to $2^N$ (N≥n). One of methods of selecting $2^n$ CRUs in consideration of CRU indexes from 0 to ($2^N$−1) may be, for example, for the UE to 1) select one of $\{0, 2^n, (2 \cdot 2^n), (3 \cdot 2^n), \ldots\}$ as a starting CRU index, and 2) transmit data by selecting/using CRUs corresponding to consecutive $2^n$ indexes from the selected starting index. For example, if 8 CRUs in total are configured as available for contention-based transmission, the number of CRUs that one UE may simultaneously select/use may be one of 1, 2, 4, and 8. Under this condition, 1) a CRU index combination for selection of 2 CRUs may be one of (0, 1), (2, 3), (4, 5), and (6, 7), and 2) a CRU index combination for selection of 4 CRUs may be one of (0, 1, 2, 3) and (4, 5, 6, 7).

If the number of CRUs that the same UE simultaneously selects/uses for data transmission is time-variant and/or each UE simultaneously selects/uses a different number of CRUs for data transmission, there may be a need for a method of enabling an eNB receiver to detect the number of CRUs. For example, a different (Gold sequence) seed value used for scrambling data and a DMRS (or a (CAZAC) root index (e.g., q in [Equation 5] to [Equation 7]) used for generation of a DMRS sequence) may be configured/applied according to the number of CRUs selected/used by the UE and/or a TBS corresponding to a data transmission. In another example, each of all CRUs selected by the UE may carry ID information (e.g., a C-RNTI) that identifies the UE, the number of selected/used CRUs, and/or CRU index information. In this case, the ID information that identifies the UE, the number of selected/used CRUs, and/or the CRU index information may be mapped directly to payload, or applied indirectly through the scrambling seed for the data and the DMRS. In another example, a different DMRS sequence length may be configured/applied according to the number of CRUs selected/used by the UE and/or a TBS corresponding to a data transmission. For example, if the number of CRUs selected/used by the UE is N, the DMRS sequence length may be set/applied to/as (N*K).

In order to receive contention-based data from the UE, the eNB may attempt blind detection as illustrated in Table 9, assuming the number of CRUs used for data transmission. In Table 9, a bold box indicates CRU candidates available for data transmission. The (maximum) number $2^n$ of CRUs included in a CRU candidate may be set to be less than $2^N$ (i.e., N>n). The starting position of a CRU candidate available for data transmission within a CRU set may be different for each UE. For example, the starting position of a CRU candidate available for data transmission may be determined based on a UE ID (e.g., C-RNTI). Additionally, the stating position of the CRU candidate may be different in each subframe. A different CRU set may be given for each UE or each UE group.

TABLE 9

| assumption | CRU index | | | | | | | |
|---|---|---|---|---|---|---|---|---|
| $B = 2^0$ | 0 | 1 | 2 | 3 | 4 | 5 | 6 | 7 |
| $B = 2^1$ | 0 | 1 | 2 | 3 | 4 | 5 | 6 | 7 |
| $B = 2^3$ | 0 | 1 | 2 | 3 | 4 | 5 | 6 | 7 |
| $B = 2^4$ | 0 | 1 | 2 | 3 | 4 | 5 | 6 | 7 |

[3] DMRS for Multi-UE Detection

For a DMRS symbol included in a CRU (see [1] and FIG. 13), M orthogonal DMRS resources may be allocated differently according to the type of a sequence used for generating the DMRS. For example, if a ZC sequence is used as the DMRS, M different (CS, REG) combinations may be allocated as M DMRS resources. Further, if a PR sequence is used as the DMRS, M different (OCC, REG) combinations may be allocated as M DMRS resources. Herein, an OCC may include a Walsh (Hadamard) code or a DFT vector (included in a DFT matrix). The M DMRS resources may be allocated to different UEs.

Figure 14:
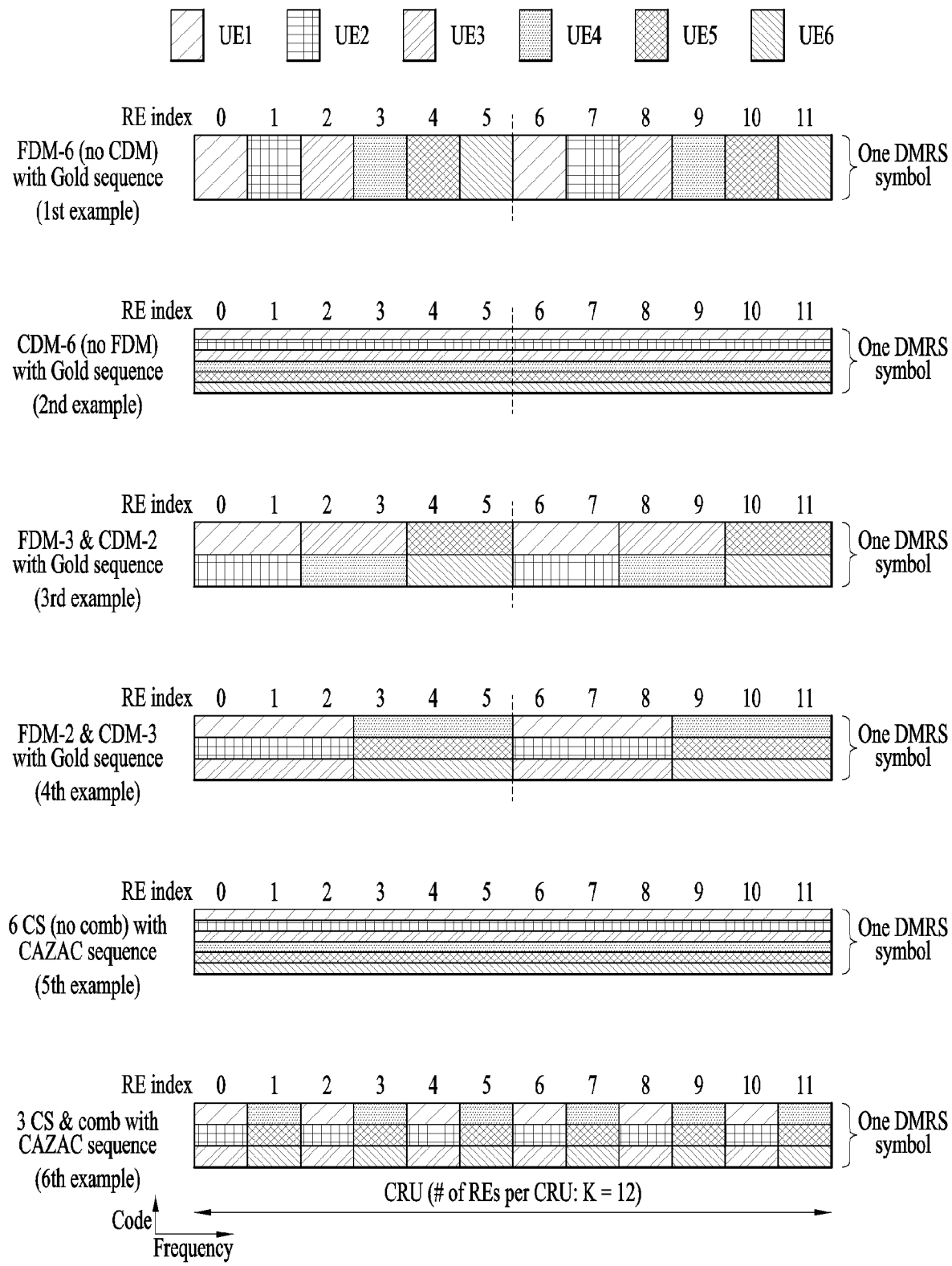

FIG. 14 illustrates examples of DMRS resource allocation for M=6 and K=12 (or M is a multiple of 6 and K is a multiple of 12). Referring to FIG. 14, in the case where a PR sequence is used as the DMRS, 1) 6 (=M) REGs including exclusive REs (to which OCCs are not applied), each REG including 2 (=K/M) REs apart from each other by 6 (=M) REs, may be allocated as different DMRS resources as in the first example, 2) with each length-6 (length-M) OCC applied twice, each time to 6 (=M) REs, 6 (=M) different OCCs may be allocated (without FUM) as DMRS resources as in the second example, or 3) with a length-X OCC applied to each of X-contiguous RE sets (REGs) having starting REs apart from each other by 6 (=M) REs (X=M/Y and Y is a factor of M, for example, X=M/3=2 (third example) or X=M/2=3 (fourth example)), 6 (=M) combinations which may be produced from X different OCCs and Y different REGs may be allocated as DMRS resources as in the third and fourth examples. That is, 6 (=M) different (OCC, REG) combinations may be allocated (the number of OCCs is X, and the number of REGs is Y).

If a ZC sequence is used as the DMRS, 1) with a length-12 (length-K) ZC sequence mapped to all 12 (=K) REs, 6 (=M) different CSs may be allocated as DMRS resources (without TC application) as in the fifth example of FIG. 14, or 2) with a length-6 (length-Z where Z=K/2) ZC sequence is applied to each RE set with an even-numbered index (e.g., an even-numbered TC) or each RE set with an odd-numbered index (e.g., an odd-numbered TC), 6 (=M) combinations that may be produced from 3 (=M/2) different CSs and 2 different TCs may be allocated as DMRS resources, as in the sixth example of FIG. 14.

[4] CRU Pool Update Procedure

If an eNB has configured a CRU pool including a plurality of CRUs, and a plurality of UEs simultaneously perform contention-based data transmissions, the CRU pool may be configured with a predetermined periodicity. Because a data generation timing and a data size may be different for each UE or may be changed over time, (semi-)static use of the number of CRUs in the CRU pool may be inefficient in terms of system resource use.

In this regard, the following method of updating a CRU pool may be considered.

1) A CRU pool use periodicity is pre-configured, and a UE may transmit its scheduling request (SR) (or buffer status report (BSR)) information to an eNB at a specific time (e.g., an SR timing) before each CRU pool use time (e.g., CRU timing).

2) The eNB may transmit (broadcast) to UEs update information for the CRU pool (e.g., parameters used for configuring one CRU (e.g., H, K, L, Q, R) and/or the number of CRUs included in a whole CRU pool) at a specific time (e.g., update timing) between the CRU timing and the SR timing based on SR information received/collected from the UEs.

3) Upon receipt of the CRU pool update information, the UE may select a CRU for use in its data transmission, on the assumption of CRU parameters and a pool configuration based on the CRU pool update information, and transmit data in the CRU.

Figure 15:
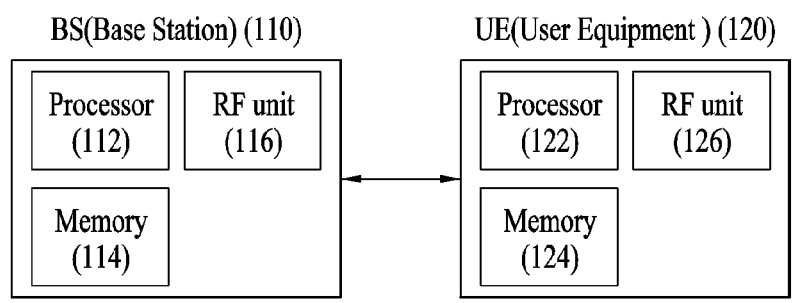
FIG. 15 illustrates a base station and a user equipment applicable to the present disclosure.

FIG. 15 illustrates a BS and a UE of a wireless communication system, which are applicable to embodiments of the present disclosure.

Referring to FIG. 15, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein

INDUSTRIAL APPLICABILITY

The present disclosure is applicable to UEs, eNBs or other apparatuses of a wireless mobile communication system.

The invention claimed is:

1. A method of transmitting data at a user equipment (UE) in a wireless communication system, the method comprising:
receiving information about a contention-based resource pool;
selecting N contention-based resources from among a plurality of contention-based resources included in the contention-based resource pool, based on a size of the data, wherein a contention-based resource is a unit in which one or more UEs perform contention-based transmission; and
transmitting the data and a reference signal for the data to a base station (BS) in the N contention-based resources, wherein N is a variable integer of 1 or more, and indicated by a seed value used for scrambling the reference signal transmitted along with the data.

2. The method according to claim 1, wherein the reference signal is generated based on a Zadoff-Chu (ZC) sequence or a constant amplitude zero auto-correlation (CAZAC) sequence, and N is indicated by a root index used for generating the reference signal.

3. The method according to claim 1, wherein N is indicated by a length of a sequence used to configure the reference signal.

4. The method according to claim 1, wherein N is limited to $2^n$ where n is an integer equal to or larger than 0.

5. The method according to claim 1, wherein each of the N contention-based resources carries data including the same UE identification information.

6. The method according to claim 1, wherein the wireless communication system includes a $3^{rd}$ generation project partnership long term evolution (3GPP LTE)-based wireless communication system.

7. A user equipment (UE) for use in a wireless communication system, the UE comprising:
a radio frequency (RF) module; and
a processor,
wherein the processor is configured to receive information about a contention-based resource pool, to select N contention-based resources from among a plurality of contention-based resources included in the contention-based resource pool, based on a size of data, and to transmit the data and a reference signal for the data to a base station (BS) in the N contention-based resources, and
a contention-based resource is a unit in which one or more UEs perform contention-based transmission, N is a variable integer of 1 or more, and indicated by a seed value used for scrambling the reference signal transmitted along with the data.

8. The UE according to claim 7, wherein the reference signal is generated based on a Zadoff-Chu (ZC) sequence or a constant amplitude zero auto correlation (CAZAC) sequence, and N is indicated by a root index used for generating the reference signal.

9. The UE according to claim 1, wherein N is indicated by a length of a sequence used to configure the reference signal.

10. The UE according to claim 7, wherein N is limited to $2^n$ where n is an integer equal to or larger than 0.

11. The UE according to claim 7, wherein each of the N contention-based resources carries data including the same UE identification information.

12. The UE according to claim 7, wherein the wireless communication system includes a $3^{rd}$ generation project partnership long term evolution (3GPP LTE)-based wireless communication system.

* * * * *